US008398733B2

(12) United States Patent
Melikyan

(10) Patent No.: US 8,398,733 B2
(45) Date of Patent: Mar. 19, 2013

(54) APPARATUS AND METHOD FOR A SPLIT TYPE WATER EXTRACTOR AND WATER DISPENSER

(75) Inventor: Zohrab Melikyan, Yerevan (AM)

(73) Assignee: Ser-Manukyan Family Holdings, Glendale, CA (US)

( * ) Notice: Subject to any disclaimer, the term of this patent is extended or adjusted under 35 U.S.C. 154(b) by 431 days.

(21) Appl. No.: 12/830,158

(22) Filed: Jul. 2, 2010

(65) Prior Publication Data

US 2011/0023504 A1 Feb. 3, 2011

Related U.S. Application Data

(63) Continuation-in-part of application No. 12/433,811, filed on Apr. 30, 2009, now Pat. No. 8,075,652.

(51) Int. Cl.
*B01D 50/00* (2006.01)
(52) U.S. Cl. .................................... 55/385.1; 62/150
(58) Field of Classification Search ................. 55/385.1; 62/150, 283, 285; 95/288
See application file for complete search history.

(56) References Cited

U.S. PATENT DOCUMENTS

| 2,116,100 A * | 5/1938 | Cracknell ................... 62/205 |
| 5,735,139 A * | 4/1998 | Lord et al. .................. 62/470 |
| 6,755,037 B2 * | 6/2004 | Engel et al. .................. 62/177 |

* cited by examiner

*Primary Examiner* — Robert A Hopkins
(74) *Attorney, Agent, or Firm* — Trojan Law Offices

(57) ABSTRACT

A split type potable water extractor from ambient air and water dispenser is invented, comprising separate water generating block located outside a water use area and water dispensing block located inside a water use area. The water generator block cycles refrigerant through a condenser and an evaporator to create condensation by heat exchange with ambient air circulated by an intake airflow system. The condensate water is collected and purified in a cascade of bactericidal loop to remove impurities. The purified water is pumped to a dispensing apparatus that can be installed in the home or other area of water use separate from the water generating block. If any one of the functional parts or units of water generator is disabled the water generator immediately stops operating to deliver water to the tank of the dispensing apparatus.

20 Claims, 13 Drawing Sheets

APPARATUS AND METHOD FOR A SPLIT TYPE WATER EXTRACTOR AND WATER DISPENSER

RELATED PATENT APPLICATION

This application is a Continuation-In-Part application of application Ser. No. 12/433,811, filed Apr. 30, 2009, now U.S. Pat. No. 8,075,652.

FIELD OF THE INVENTION

This invention relates to a technology for extracting water from ambient air for human use.

BACKGROUND OF THE INVENTION

In many developing and even developed countries there is a dire need for potable water. Moreover, in many areas water is taken from non-treated sources that may contain significant amounts of viruses, bacteria, heavy metals and other dangerous contaminants to human health. The Natural Resources Defense Council estimates that even in the U.S. hundreds of people die each year from water-borne diseases. Given the need for potable water, it is becoming urgent to develop highly efficient, simple and reliable technologies for generating pure water from ambient air.

In the prior art, water generators have not proven to be efficient in satisfying the need for potable water. Such water generators have suffered from a number of disadvantages, which make the energy and economic costs of producing potable water impracticable. One disadvantage is that such water generators are generally not designed to be of the split type, with the water generating unit separated from the water dispensing unit to optimize efficiency. Another disadvantage of prior art water generators is that they are equipped with evaporators having defrosting facilities based on hot refrigerant gas flow bypassing reverse cycle. The described kind of deicer system requires complication of the generator structure, and at the same time consumes more energy without producing water during all the process of reverse cycle defrosting. And yet another disadvantage of other water generators is that they are not energy efficient because they use compressors that operate to maintain a cold set-point temperature within the water reservoir that requires the operation of the compressors even when the generators do not actively produce water. Consequently, existing water generators have been demonstrated to consume a lot of energy while not allowing permanent and reliable water production.

Accordingly, there is a need for an efficient system and method of extracting potable water from ambient air according to this invention, wherein outside air is cooled by a refrigeration system in consequence of which the vapor contained in air is condensed and transformed into water which is collected in a closed tank and further, after having been purified in a cascade of bactericidal loop, is pumped into a water dispensing block, which can be installed in the home or other areas of water use. In present invention the disadvantages of the prior art are eliminated, while improving the reliability and energy efficiency, reducing initial cost per unit of water productivity, optimizing process parameters including air flow through the evaporator and condenser, and maintaining the quality of recovered water, etc.

The objects and advantages of the present invention are:

(a) providing a potable water source for use in remote and waterless areas;

(b) providing a potable water supplying split type installation consisting of a water generator block located outside and a water dispensing block located inside of the water use areas for delivering hot, cold and ambient temperature water;

(c) providing a stationary water generator that does not need to be moved or shifted and can be hanged on the wall outside surface or stand on ground near the house without occupying inside space and influencing the inside microclimate;

(d) providing a simple construction of water generator designed for operating long periods in non-freezing regime, without use of heating strip and hot gas reversing deicing systems;

(e) providing an apparatus which can easily be assembled from prefabricated elements and modules;

(f) providing a pure water generating apparatus that is proofed from organic compounds, insects and any other contaminations, in accordance with ASHRAE and U.S. federal standards;

(g) providing a low initial cost, high energy efficiency, reliable, cost effective and ecologically safe water generating apparatus;

(h) providing an apparatus which produces high-quality, purified water, by means of coating evaporator dew forming surface with special inert painting, with medical-grade tubing and with 314L stainless steel made interior and exterior cabinet;

(i) providing a stationary, high energy efficiency water generator which is equipped with variable speed fans for regulating the flow of intake outside air and respectively controlling the water productivity;

(j) providing a water generator which is equipped with direct and reverse rotating fans for intaking outside air and for periodically operating in reverse mode to move the air in reverse direction for expelling dust and pollen from the air filters to alleviate clogging of the air filters;

(k) providing a water generator which is equipped with inward-opening revolving doors installed on the vertical side panels of the water generating block and located between an evaporator and a condenser for regulating the quantity and temperature of air mixture blown through the condenser to regulate refrigerant condensation temperatures under various outside air temperatures and relative humidity;

(l) providing a water generator equipped with a processor charged by special program which regulates the refrigerant's condensation temperatures by mean of changing the openings of revolving doors and thereby changing quantity and temperature of air mixture blown through the condenser;

(m) providing a water generator which is equipped with a sampling servomechanism for automatic opening and proper positioning of revolving doors in response to the programmed matrix of required air flow through the evaporator and condenser under various combinations of air temperatures and relative humidity;

(n) providing a water generator which is equipped with gravity louvered screen doors, which automatically closes when the generator is switched off and prevents penetration of insects and bacteria into the mixing chamber;

(o) providing a water generator which is equipped with special sensors system and operating mechanism for stopping the operation of the generator when ambient air temperature is lower than 20° C. and relative humidity is less than 30%;

(p) producing potable water from outside air with much lower specific cost compared to bottled water;

(q) providing an efficient and reliable compressor for the water extractor;

(r) minimizing the size of the evaporator and condenser;

(s) maintaining the refrigerant at an acceptable temperature and pressure;

(t) providing high quality of potable water;

(u) providing reliable operation of the compressor and water extractor;

(v) providing animated and structured water.

SUMMARY OF THE INVENTION

This invention is for a split type potable water extractor from ambient air and water dispenser for use in remote and waterless areas consisting of a water generating block and a water dispensing block. The generating block is located outside the water use area and has direct contact with outside air and the water dispensing block is located inside the water using area. The extractor is designed to be split type, that is to say composed of separately standing water generating and water dispensing units (blocks).

The potable water generator block functions to extract water from the outside atmosphere air by cooling. The invented water generator block is a stationary device that does not need to be moved or shifted and can be hanged on the outside surface of wall or stand on ground near the house without occupying inside space.

The split type structure is directed to avoid of the problem of creating dry microclimatic conditions in the dwelling place that results from long period use of inside air as a water source since the inside air becomes extremely dried and, therefore, unusable as a sustained water source. For these reasons the developed apparatus uses only fresh outside air as water containing medium, which at the same time has the advantage of being much cleaner than the inside air.

The apparatus is designed for operating long periods without freezing problems because the intake air is not cooled up to the dew point temperature. Instead, in this extractor the surface temperature of the evaporator is kept below the dew point temperature of air by cold refrigerant.

In consequence of heat exchange the air is cooled up to temperatures far higher than the dew point, but enough for condensing the water vapor on the surface of evaporator. The water from the surface of the evaporator drips into a receptor pan and then runs into a closed tank system equipped with a level control device which is connected to the generator's switching off/on panel.

For producing high-quality, purified water the heat transfer surface of the evaporator is coated by special food type inert painting and all interior and exterior of the housing are made of medical-grade 314L stainless steel. With the use of a pump, the water repeatedly circulates through a cascade of water filters. The preferred filters are high rate and small-pore filter/adsorption media such as a porous-carbon block in a NSF-53 certified filter, which filters from the water organic compounds, insects, and any other contaminants. Such purification is done in accordance with ASHRAE and U.S. federal standards.

The purified water from the cascade of bactericidal loops goes through a solenoid valve, which is controlled by a timer. The water is then pumped into a water storing tank of a dispensing block, which is installed separately at a house or at other areas of water use. From this storing tank the collected pure water first passes through a UV tube for sanitation purposes and then is distributed among tanks of ambient temperature water, hot water, and cold water. The water is dispensed by turning on a push button type tap.

The water generator's refrigerant condenser is equipped with variable speed fans for regulating the quantity of outside air intake and controlling the production of water. The regulation of intake takes place by changing the RPM of the fans. This is executed by commands of a processor operating in accordance to a matrix of airflow predetermined for outside air temperatures and relative humidity ("RH") combinations. The fans can periodically perform in reverse mode to expel dust and pollen from the air filters without shutting down the device. As a result, there is no need to complicate the filter assembly with sensors and other facilities to warn when the air filter is corked. In the reverse mode, the outside air first passes through the condenser where it is heated and then passes through the evaporator and air filter in reverse direction. Besides cleaning the filter, the reverse flowing hot air stimulates the evaporation of the liquid refrigerant in the evaporator and eliminates the freezing of evaporator. During the short period of air filter cleaning, the water generator continues to operate and water production is not interrupted. The periodicity of fan's reverse mode is predetermined and executed with the help of a timer connected to the electric circuit of the fan's motor.

To control refrigerant condensation, it is necessary to control the quantity and temperature of the mixture of cooled and dried air as well as the quantity and temperature of the outside air blown through the condenser. For this purpose, the water generator is provided with inward-opening revolving doors that are installed on both sides of the generator's air mixing chamber. The inward-opening revolving doors are located between the evaporator and the condenser for regulating the temperature and quantity of airflow through the condenser. Controlling the amount of airflow to the condenser is accomplished by automatically opening and properly positioning the revolving doors. A sampling servomechanism connected to the shaft of the doors can serve this purpose. The sampling servomechanism operates in response to the commands of a processor. The processor acts in accordance to a programmed matrix of required airflow through the evaporator under various combinations of air temperatures and relative humidity. All openings, doors and ports are equipped with gravity louvered screen doors, which automatically close the port to prevent penetration of insects and bacteria into the air mixing chamber when the generator is switched off.

The water generator is equipped with a special sensor system and operating mechanism for stopping the operation of the generator when ambient air temperature is lower than 20° C. and relative humidity is less than 35%. If ambient air temperature goes higher than 20° C. the sensor system and operating mechanism automatically restart the generator and the water supply is continued. If any one of the units of water generator is disabled the apparatus immediately stops functioning to deliver water to the tank of the dispensing block. If both the generator block's water tank and the dispensing blocks' water storing tank are full of water, the level control device switches off all parts of the generator.

In another preferred embodiment of the invention, the liquid refrigerant is sub cooled after it exits the condenser. This serves to increase the efficiency and the reliability of the water generator. To further increase compressor efficiency and reliability, the suction gas refrigerant is superheated after it exits the evaporator.

To increase efficiency and to prevent hydraulic shocks, an economizer is installed between the condenser and the evaporator. The economizer is connected by one side to the discharge line of the compressor and by opposite side to the suction line of the compressor.

It is preferable to minimize the total size of the evaporator and the condenser. To achieve this, software was developed to calculate the design characteristics of the generator and to determine the optimal quantity of ambient air passing through evaporator and condenser. This software is also useful for maintaining acceptable condensing temperature and pressure levels of the refrigerant, which is particularly important while operating under very high ambient temperatures.

In order to provide high quality potable water, the water extractor is equipped with a newly developed and constructed plate and tube type evaporator made of stainless steel, and the inside surface of water collecting tank of the extractor is covered by silver coating. Silver is a well known antimicrobial agent and helps maintain the purity of the water.

In addition, the preferred embodiment provides reliable operation of the compressor and water extractor using an oil separator is installed on discharge line of compressor. This oil separator is connected on the bottom side to the crankcase inlet pipe of the compressor and on the top side to the condenser. Also assisting with the operation of the compressor and water extractor is a liquid refrigerant separator installed on suction line of compressor. The liquid refrigerant separator is connected on the bottom side to the evaporator's inlet pipe and on the top side to the compressor.

To provide animate nature and structure water the extractor is equipped with music player chip installed near the water collecting tank and permanently playing classical music of Vivaldi, Mozart, Beethoven, Bach, and others.

The invented water generator does not need any type of energy consuming deicing system and, therefore, it is energy efficient and simplified by construction. It can easily be assembled from prefabricated equipment, elements and modules.

The present water generating apparatus provides lower initial cost, provides higher energy efficiency, is cost effective, and is ecologically safe. Thanks to the indicated series of advantages the cost of producing water with this machine is much cheaper compared to bottled water.

DETAILED DESCRIPTION OF THE INVENTION

Figure 1:
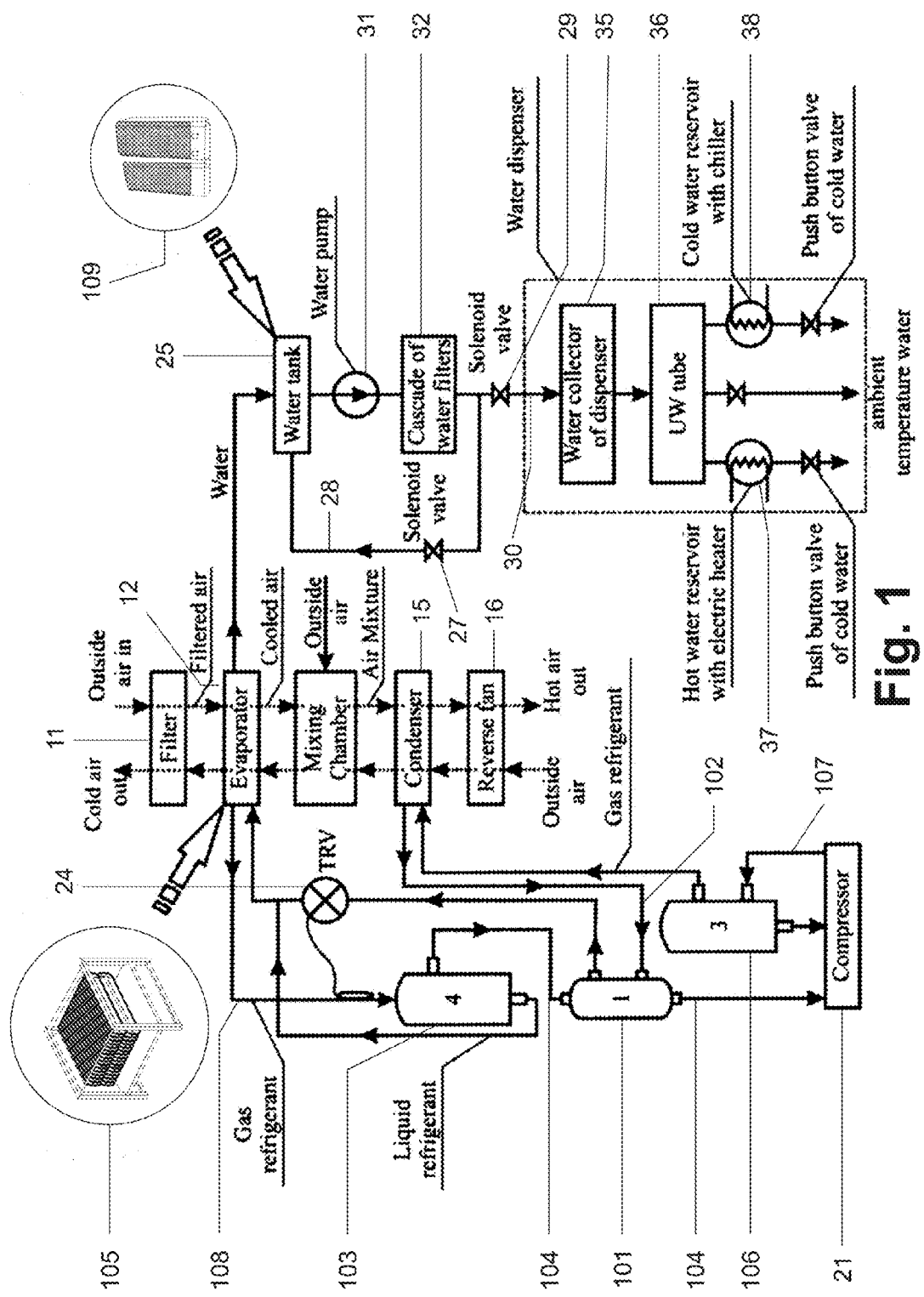
FIG. 1 is a block diagram showing the individual functional components, sub-assemblies, and interconnections that comprise the present invention and alternative embodiments thereof.

The water generation process, treatment and dispensing flow diagram are shown in FIG. 1, which represents functional components, sub-assemblies, controls, interlocks and provides the sequences of air treatment, water formation and purification, water dispensing and operation of all main and auxiliary equipment.

Figure 2:
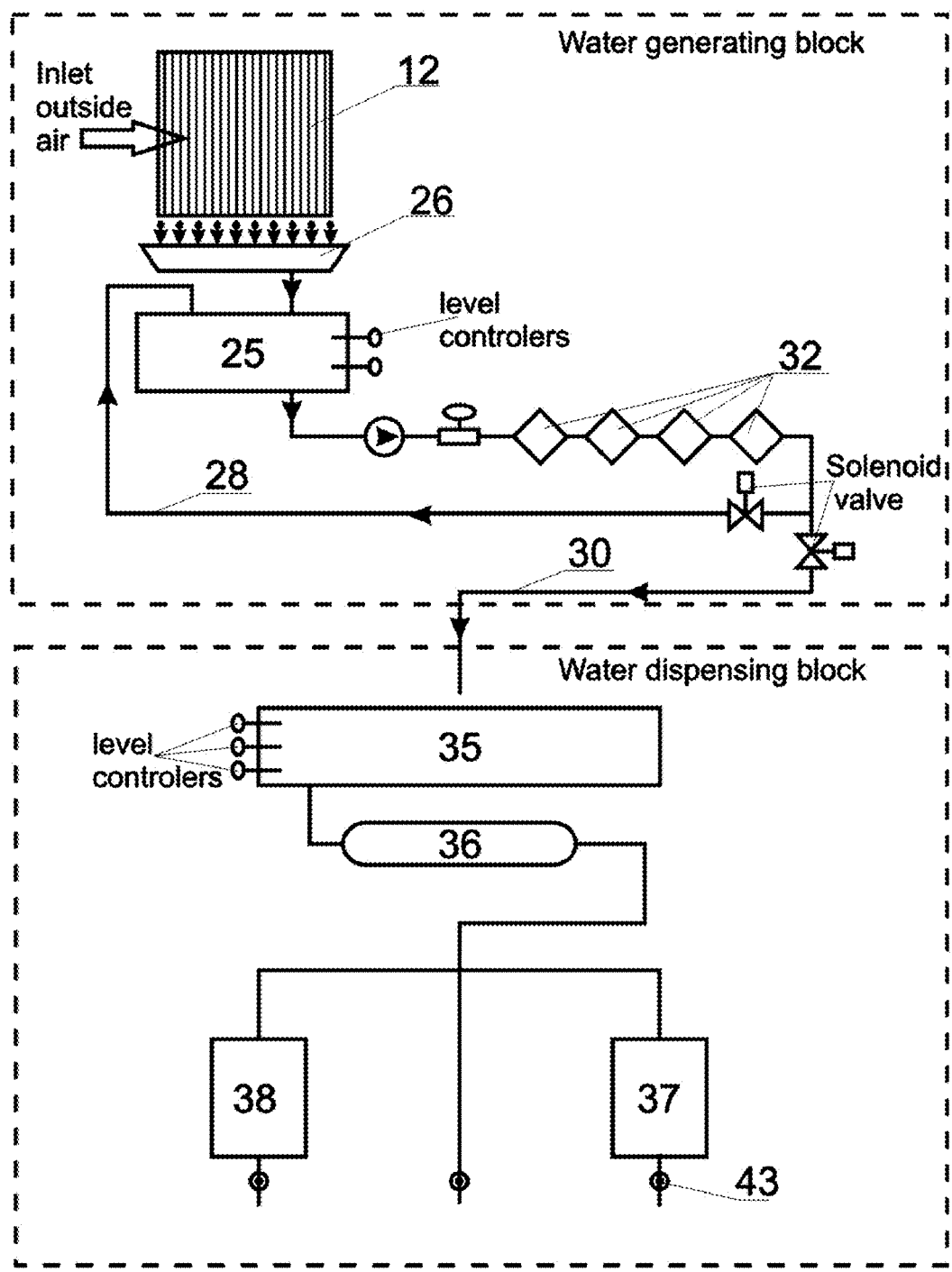
FIG. 2 is a block diagram showing the hydraulic scheme and functional components, sub-assemblies, controls, interlocks, which comprise the present invention and water dispensing embodiments.

FIG. 2 is a block diagram of the functional components, sub-assemblies, controls, interlocks of water dispensing block with cooled, heated and ambient temperature waters according to an embodiment of the present invention.

Figure 3:
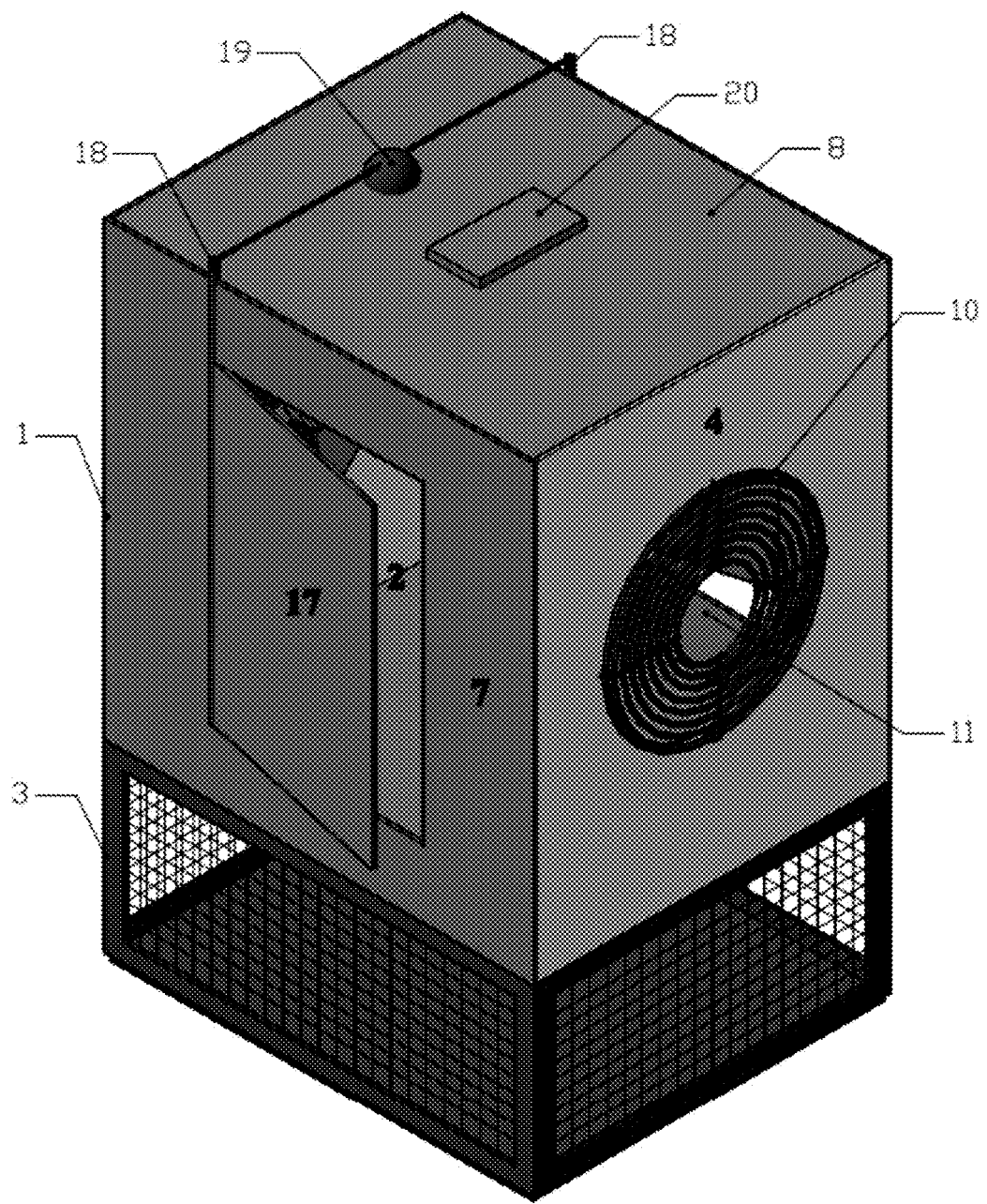
FIG. 3 is a front perspective view of a water generating block according to an embodiment of the present invention with air mixing and compressor chambers.
Figure 4:
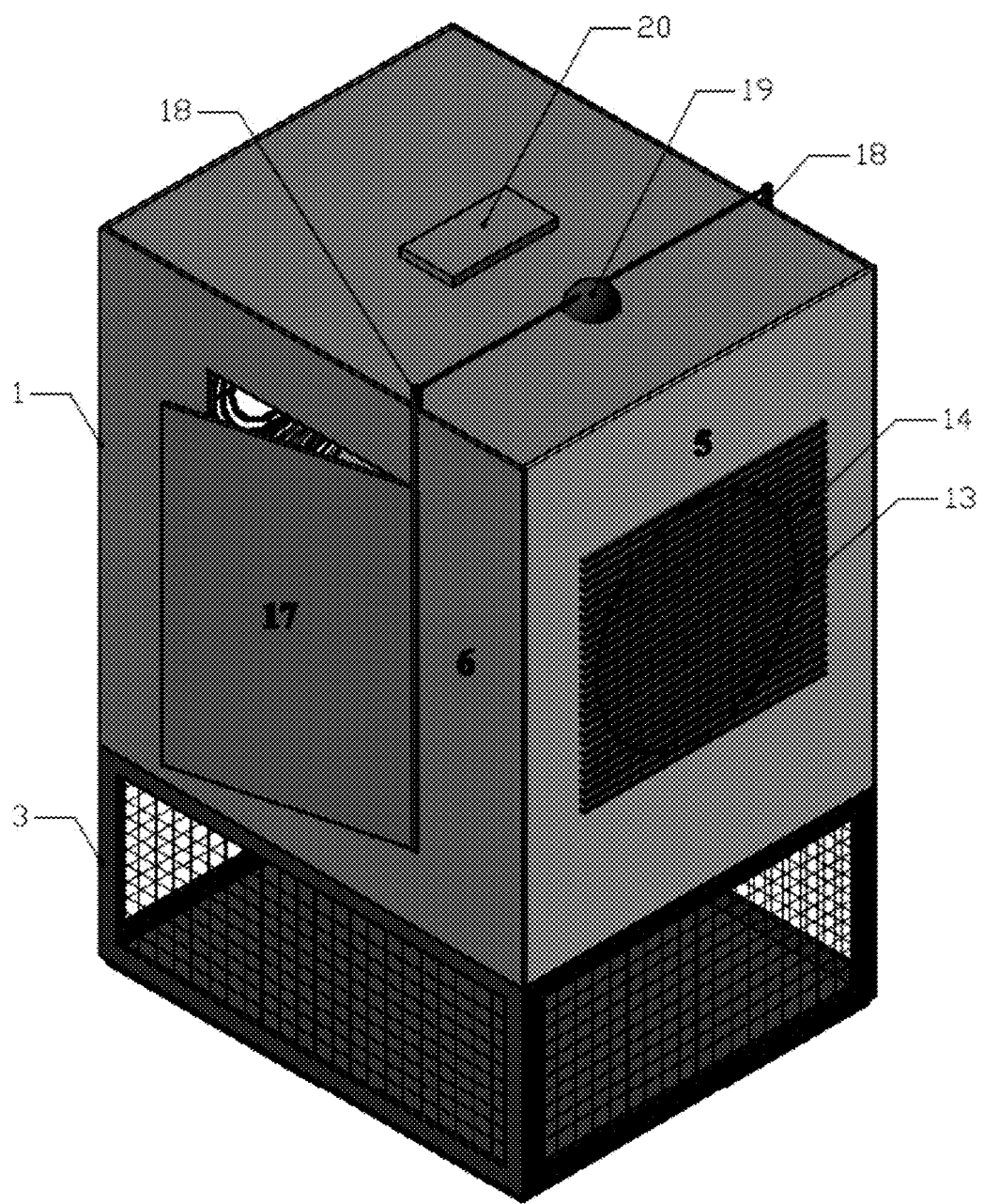
FIG. 4 is a rear perspective view of a water generating block according to an embodiment of the present invention with air mixing and compressor chambers.

FIG. 3 and FIG. 4 represent perspective views of the new configuration of the invented water generation system. The working components are enclosed in an air mixing chamber 2 formed by front panel 4 with intake air inlet port 10 and intake air filter 11, rear panel 5, vertical right side panel 6 with an inward-opening revolving door 17 with shaft 18, vertical left side panel 7 with an inward-opening revolving door 17 with shaft 18, top panel 8 with sampling servomechanism 19 and position command generating processor 20, as well as the compressor chamber 3 and ventilation grills 22.

In the perspective view of an embodiment of the water generating block of FIG. 4 is shown the rear panel 5 of the air mixing chamber 2 on which is located a port 13 for outlet of processed and dried air. The port 13 is equipped with a gravity type louvered screen 14 that automatically closes for preventing the penetration of insects and dust in the air mixing chamber 2 when water generating block is switched off. On the vertical right side panel 6 of the mixing chamber 2 is installed an inward-opening revolving door 17 for inflow of outside air and mixing with dried cooled air allowing air mixture of higher quantity and lower temperature which passes through the condenser 15 mounted on the rear panel 5 of the mixing chamber 2 (see FIG. 5). The noted air mixture of higher quantity and lower temperature provides better cooling and efficient condensation of the refrigerant in the condenser which is especially needed when the generator operates under very hot and humid climatic conditions.

Figure 5:
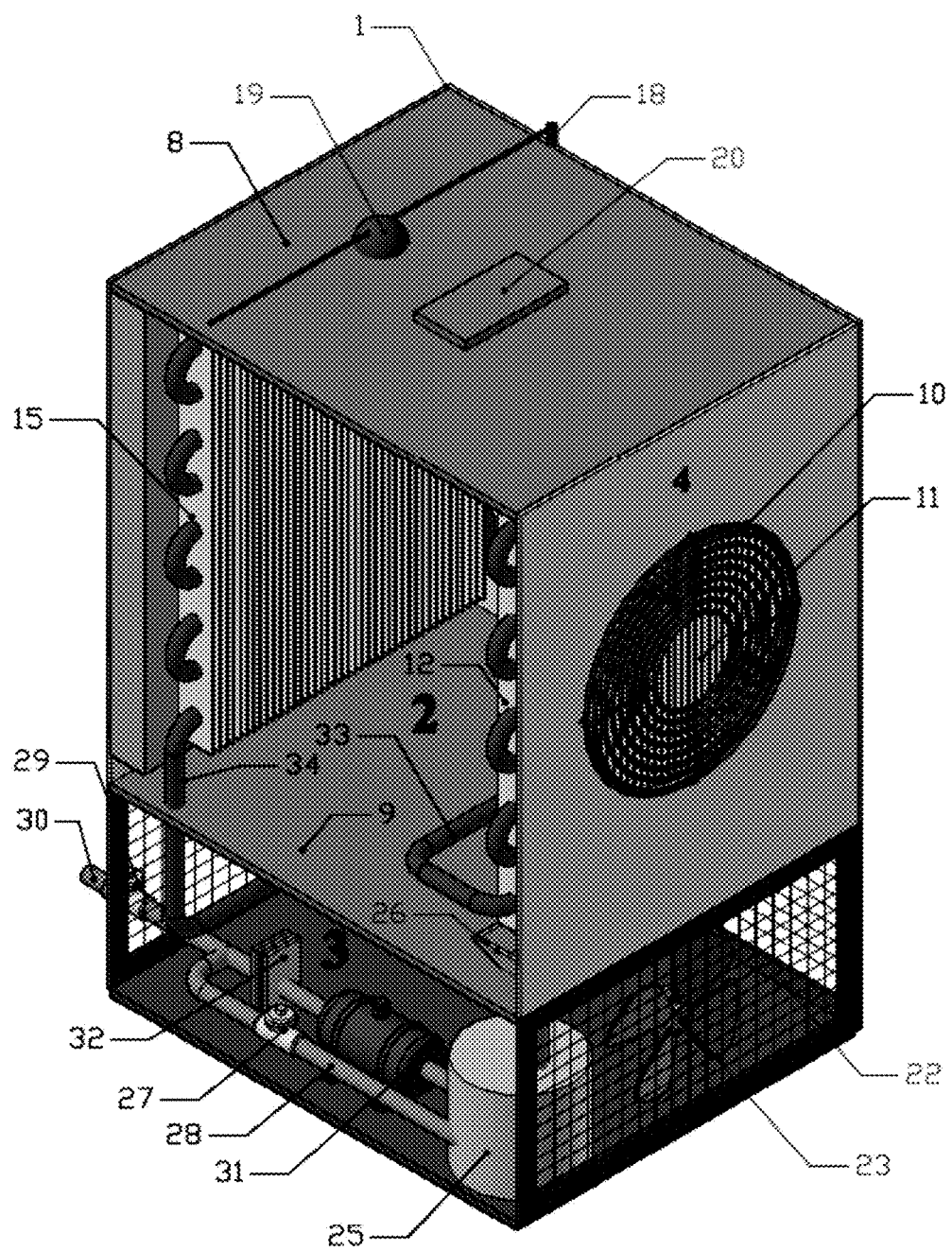
FIG. 5 is a perspective view of a water generating block according to an embodiment of the present invention, with a cut-away inside perspective view of the air mixing chamber and the compressor chamber.

FIG. 5. is a cut-away inside perspective view of the water generating block with the left side vertical panel 7 of air mixing chamber 2 removed to show the evaporator 12 mounted on intake air inlet port 10. The intake air inlet port 10 has an easily replaceable air filter 11. A water receiving tray 26 is installed under evaporator 12 for collecting by gravity the water drops extracted from cooled air on the food graded coated surface of evaporator 12. On the outlet air port 13 of the rear panel 5 the condenser 15 is mounted. In FIG. 5 the inside perspective view of compressor chamber 3 is also represented. The compressor chamber 3 is completely separated from the mixing chamber 2 by bottom panel 9 for preventing hot air penetration from compressor chamber 3 into the air mixing chamber 2 which can result in changes of predetermined temperature regimes of the condenser and evaporator.

Figure 6:
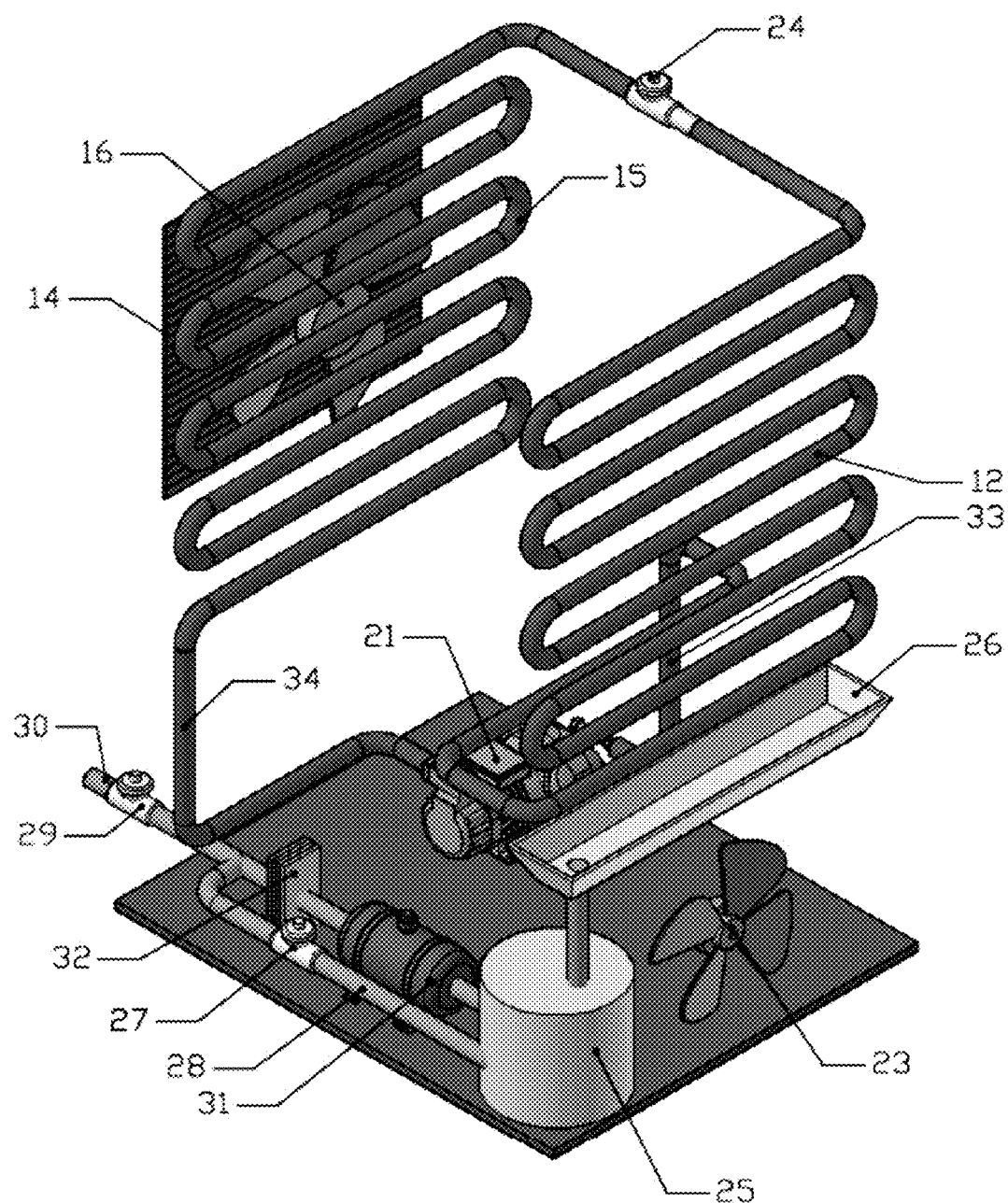
FIG. 6 is a perspective view of the core of the water generating block with interconnections of all functional parts including: evaporator fin tube coil with water receiving tray, condenser fin tube coil with variable speed reverse fan and gravity type louvered screen, refrigerant temperature regulating valve ("TRV") mounted on liquid line, and compressor chamber with compressor, ventilation fan, water collecting tank, water solenoid valves, water pump, cascade of water filters, water supply pipe to the dispenser block.
Figure 7:
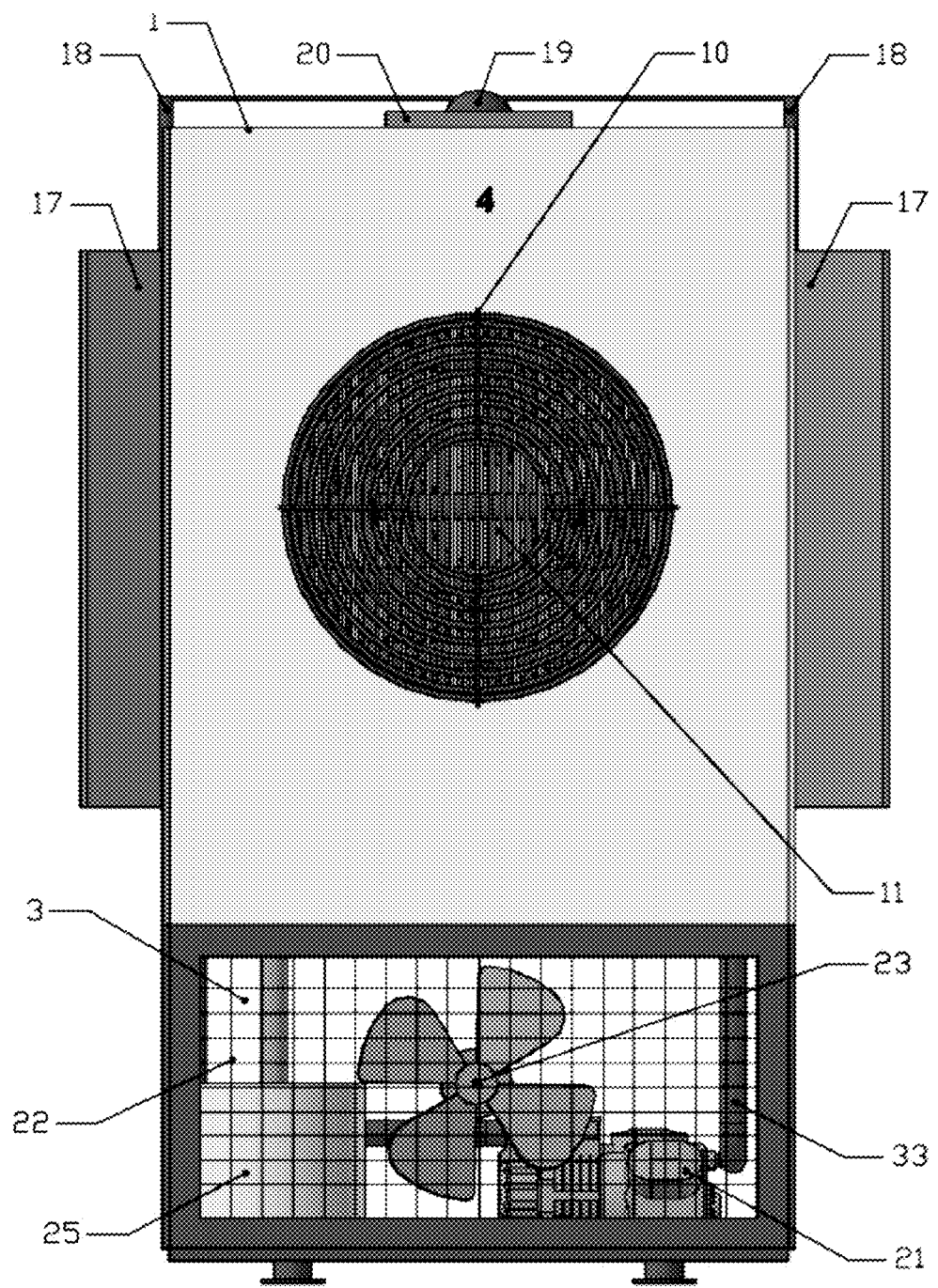
FIG. 7 is a front view of an embodiment of the water generating block.
Figure 8:
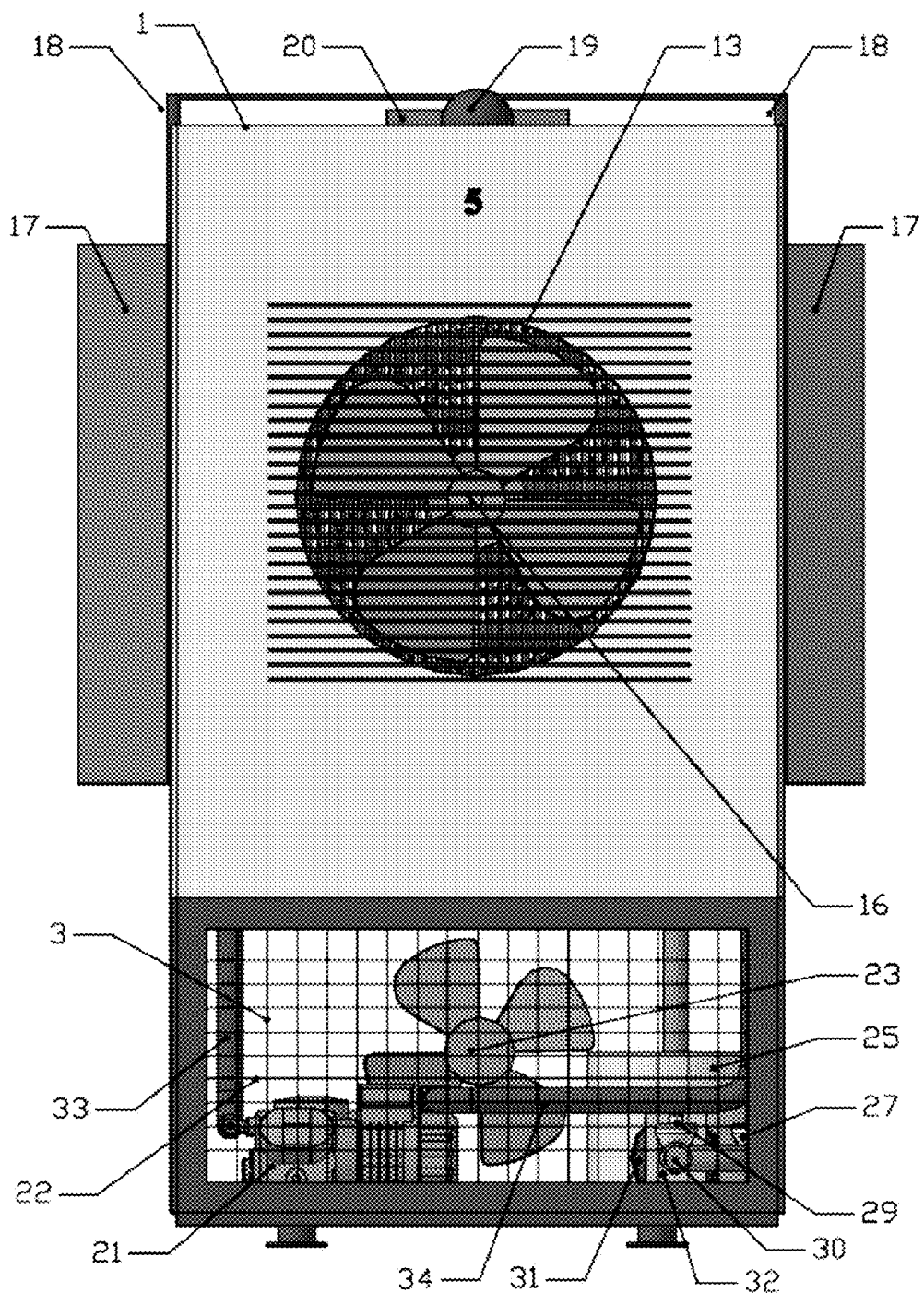
FIG. 8 is a rear view of an embodiment of the water generating block.
Figure 9:
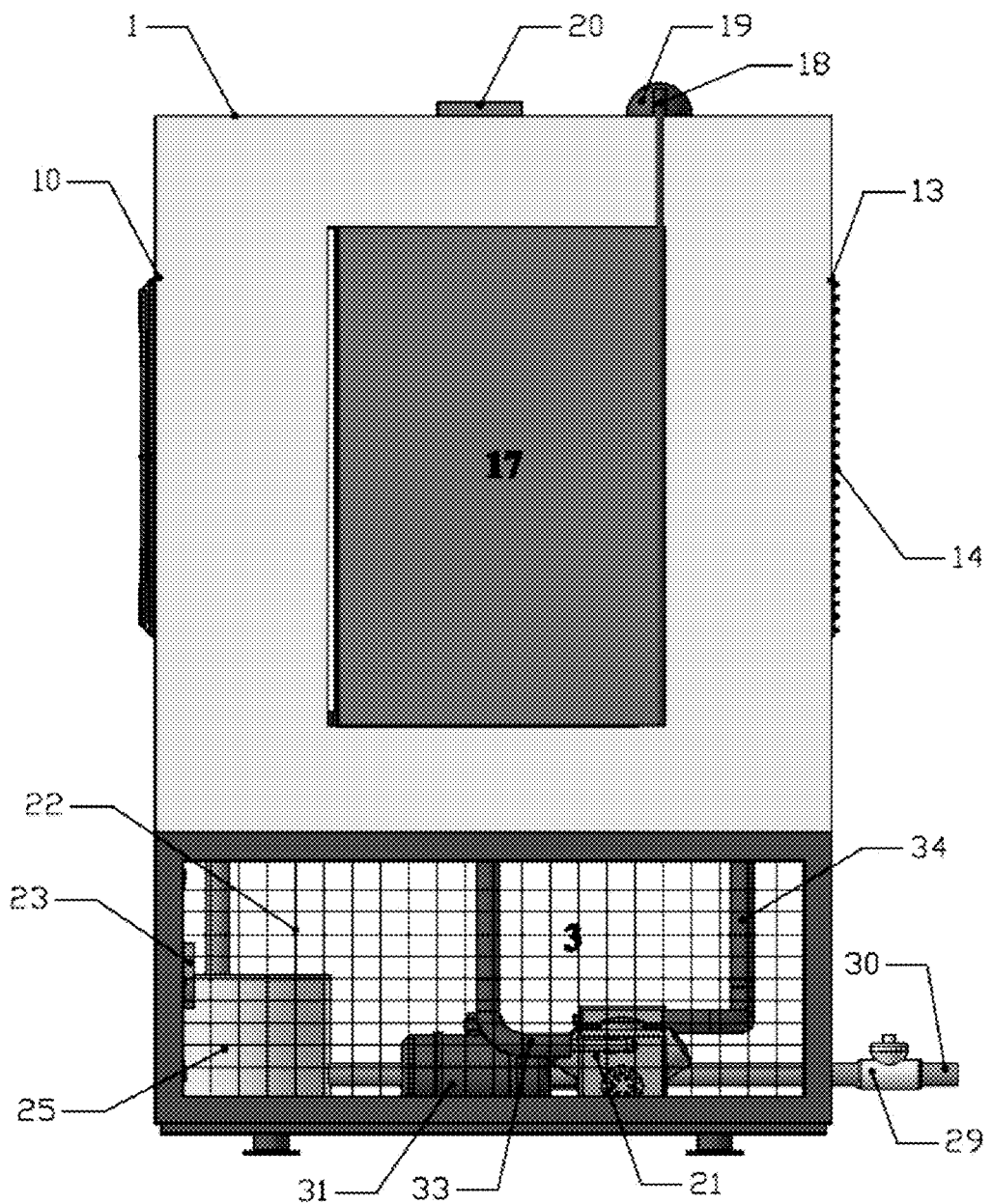
FIG. 9 is a right side view of an embodiment of the water generating block.
Figure 10:
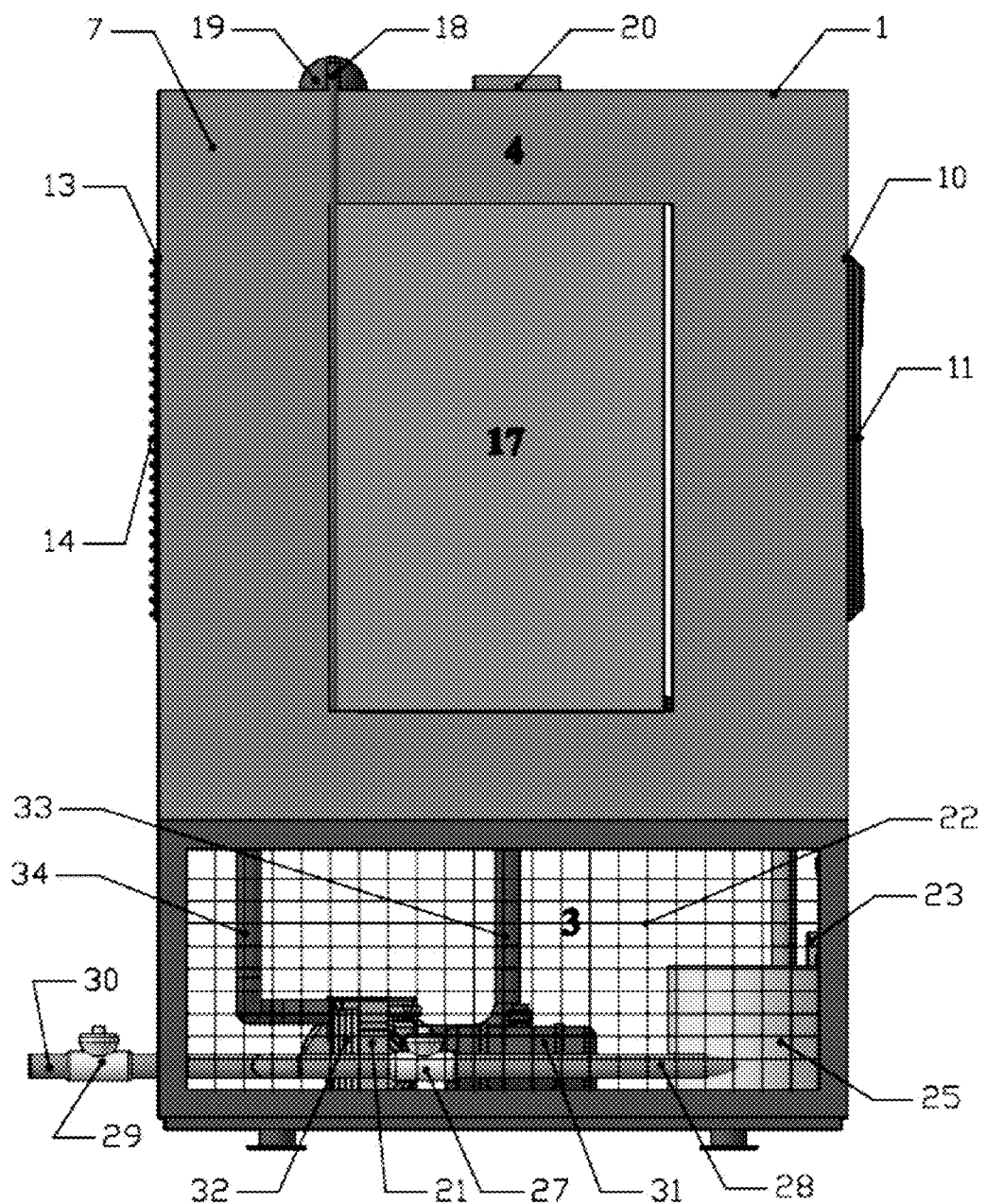
FIG. 10 is a left side view of an embodiment of the water generating block.

FIG. 6 represents a perspective view of the core of water generating block with interconnections of all functional parts including: evaporator fin tube coil 12, water receiving tray 26, condenser fin tube coil 15 with variable speed reverse fan 16 and gravity type louvered screen 14, and a refrigerant temperature regulating valve ("TRV") 24 mounted on liquid refrigerant line. The implementation of the variable speed reverse fan 16 allows cleaning of the intake air filter by means of reverse air stream periodically blown through the air filter in reverse direction without stopping the generator. This method of filter air cleaning increases the water generation efficiency. FIG. 6 represents also the perspective view of interconnections of the compressor 21 with its suction 33 and discharge 34 tubes, ventilation fan 23, water collecting tank 25, water solenoid valves 27 and 29, water pump 31, cascade of water filters 32, water supply pipe 30 to the dispenser block.

FIG. 7, FIG. 8, FIG. 9 and FIG. 10 are respectively the front view, rear view, right side vertical view and left side vertical view of the basic embodiment of the present invention. The figures include front 4, rear 5, right side 6 and left side 7 vertical panels of the air mixing chamber 2 with both of the inward-opening revolving doors 17, shafts 18 connected to the sampling servomechanism 19 and revolving doors required positions command generating processor 20 on the top panel 8. In the mentioned figures are shown all four side vertical views of the compressor chamber 3 including: compressor 21 with refrigerant suction 33 and discharge 34 piping, water collecting tube connected to the water collecting tank 25, water pump 31, cascade of water filters 32, water supplying pipe 30 with water solenoid valve 29, water recirculation pipe with solenoid valve 27, compressor chamber ventilation grills 22 and compressor's cooling ventilation fan 23.

Figure 11:
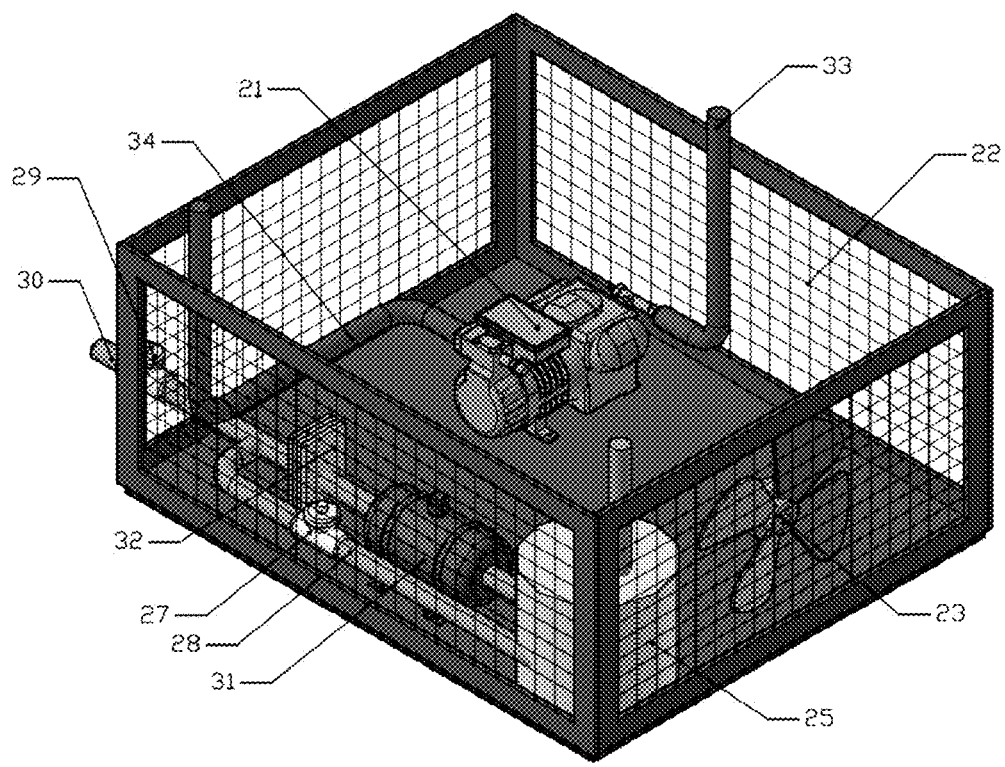
FIG. 11 is a perspective view of the compressor chamber of the water generation block of the present invention.
Figure 12:
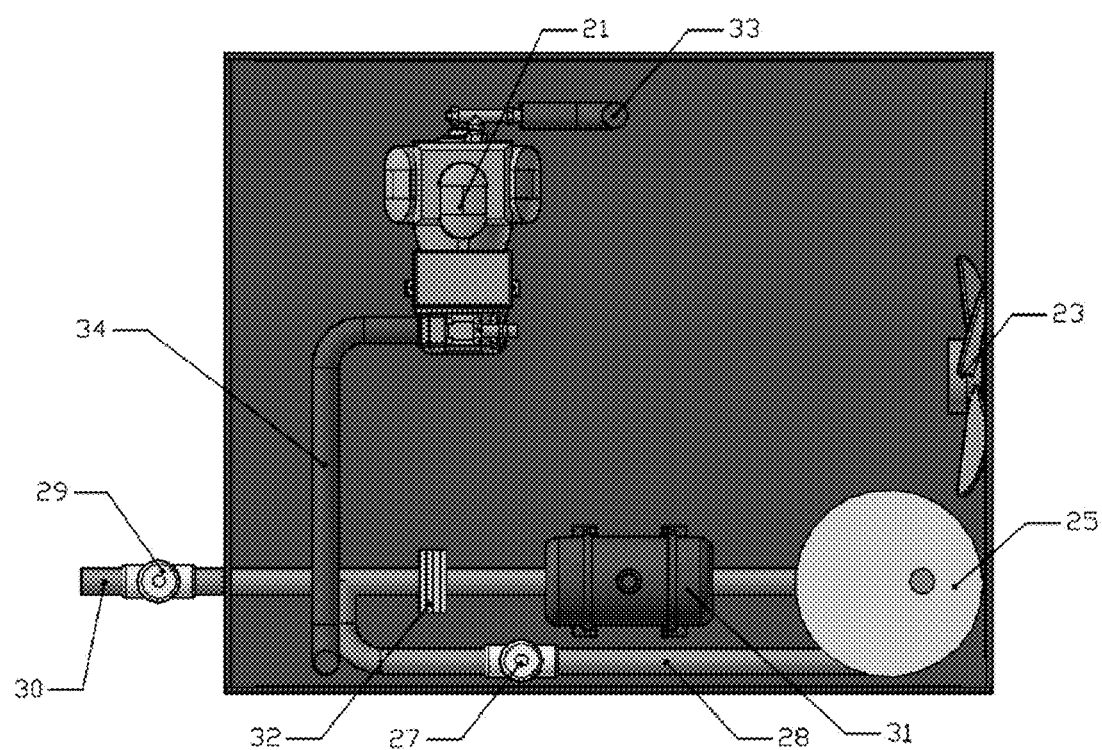
FIG. 12 is a top view of the compressor chamber of the water generation block.

FIG. 11 and FIG. 12 represent respectively the perspective view and top view of the compressor chamber 3 of the water generation block of the present invention. The figures show the arrangement of main equipment including: compressor 21, refrigerant suction 33 and discharge 34 pipes, water collecting tank 25, water pump 31, cascade of water filters 32, water supplying pipe 30 with solenoid valve 29, water recirculation pipe 28 with solenoid valve 27, ventilation grills 22 and compressor's cooling ventilation fan 23. The ventilation fan 23 serves for improving operation conditions of the compressor by its effective cooling which is essential in hot climatic conditions.

The water in the collecting tank 25 is periodically re-circulated through the cascade of water filters 32 by pump 31 and recirculated by bypassing pipe 28 and opened water solenoid valve 27. The repeated circulation of generated water through the cascade of water filters by the action of the pump 31 allows using high rate and small-pore, adsorption media such as a porous-carbon block in the NSF-53 certified filter for filtration of the water from organic compounds, insects, organic contaminants and heavy-metal compounds to purifying the water in accordance with ASHRAE and U.S. federal standards. During the recirculation the solenoid valve 29 is closed. A timer connected to solenoid valves 27 and 29 controls the predetermined duration of recirculation. When the water in the tank 25 is purified the timer closes the solenoid valve 27 and opens the solenoid valve 29 and pure water is pumped via the water supplying pipe 30 to the water storing tank 35 of the water dispensing block.

Figure 13:
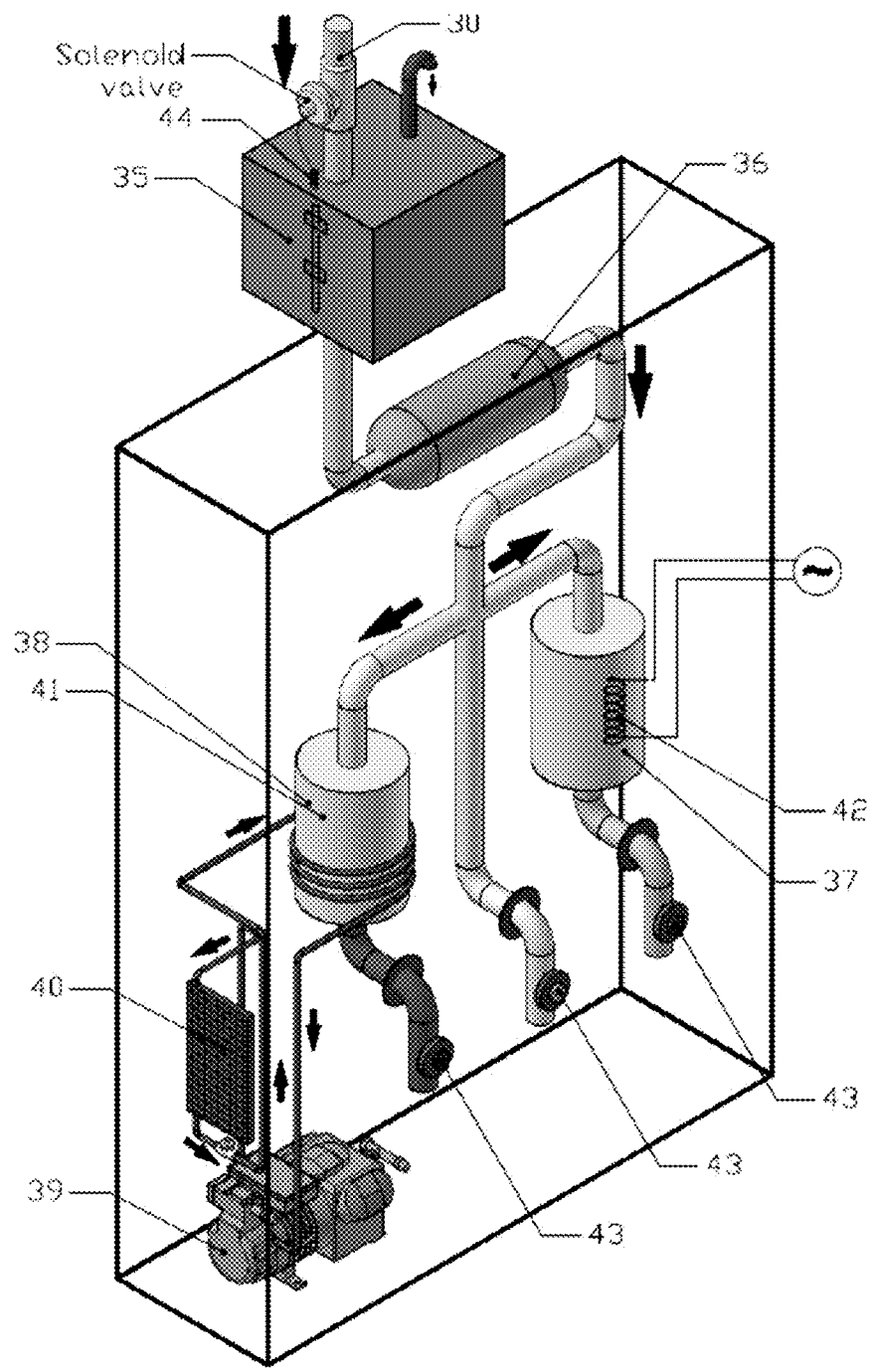
FIG. 13 is a perspective view of the water dispensing block of the present invention.

FIG. 13 is a perspective view of an embodiment of a water dispensing block of the present invention, showing the arrangement of main equipment including: purified water storing tank 35 connected to the water supplying pipe 30 coming from water generator block. The water storing tank 35 is equipped with air eliminator and water level controlling sensors 44, UV tube 36. The pure potable water flows through the UV tube by gravity into the hot water insulated tank 37 having electric heater 42 and cold water insulated tank 38 having cooling coil 41 of a water chiller consisting of a compressor 39, condenser 40 and TRV. The cold, hot and ambient temperature waters are delivered to users trough push button taps 43 mounted on corresponding delivering tubes.

The water level in the water storing tank 35 is controlled by electrically-operated sensor switch 44, which causes the pump 31 to cease operation when the water storing tank 35 is filled. When both water storing tank 35 of the dispenser block and water collecting tank 25 of the water generator block are filled the electrically-operated sensor switch stops both compressor 21 and water pump 31 of the water generator block. When water storing tank 35 of the dispenser block is full of water and water collecting tank 25 of the water generator block is empty or not completely filled the electrically-operated sensor switch stops the water pump 31 of the water generator block but compressor 21 continues operating for producing water to fill the water collecting tank 25 of the water generator block.

Operation of the Apparatus of the Invention

The compressor unit 21 installed at the bottom of compressor chamber 3 of the water generator block 1 exhausts the refrigerant's vapors from the evaporator 12 by the refrigerant suction tube 33 and after having compressed it up to the condensation pressure forces into the condenser 15 by discharge pipe 34. The ribbed pipe type condenser 15 is mounted on the rear panel 5 of the housing of air mixing chamber 2 of water generator block 1. The condenser 15 is equipped with direct and reverse rotating variable speed exhausting fan 16. In the condenser 15 the vapor of refrigerant transfers its latent heat to the mixture of cooled and outside air that is exhausted through the heat transfer surface of the condenser 15 by the help of fan 16. As a result of heat exchange the air mixture is heated and evacuated outside and the vapor of the refrigerant transforms into liquid and then passes through the temperature regulating valve ("TRV") 24. In the TRV 24 the pressure of the liquid refrigerant is decreased to a value that provides temperature of the liquid refrigerant below the value of dew point of intake outside air. The cold liquid refrigerant enters into the evaporator 12 and fixes temperature on its surface approximately equal to the temperature of liquid refrigerant.

The direct and reverse rotating variable speed fan 16 draws the outside air into the inside space of air mixing chamber 2 of the water generator block 1. Incoming outside air first is filtered through tightly-sealed and easy replaceable filter 11 fitted on the air intake port 10 of the front vertical panel 4 of air mixing chamber 2 for removing particulates, insects, dust and aerosols from the incoming air. Then the incoming air passes through finned tube evaporator 12 coated with special inert food grade painting. The cold refrigerant keeps the surface temperature of the evaporator lower than the dew point temperature of air. In consequence of the heat exchange the intake outside air is cooled and the water vapor contained in the air is condensed on the food graded coated surface of evaporator 12. In this heat exchange process the liquid refrigerant transforms into gas (vapor) and sucked again back into the compressor 21. The water from the surface of the evaporator drips by gravity into a receptor tray 26 installed under the evaporator 12. From receptor tray 26 the water by a tube runs by gravity into a water collecting tank 25.

The processed and dried air mixture is evacuated outside through the condenser 15 and outlet port 13 installed on the rear panel 5 of the air mixing chamber 2. The outlet port 13 is equipped with gravity type louvered screen 14 which is opened under air-blast and automatically closes and provides the tightness of air mixing chamber 2 for preventing the penetration of insects and dust when water generating block is switched off.

For controlling the temperature of condensation under variable temperatures of outside air it is necessary to draft variable quantity of air through the condenser 15. For regulating the quantity and temperature of air that has to pass through the condenser 15, a mixture of dried and cold air exiting from the evaporator 12 and outside air is used. To prepare the mixture of airs the water generator is equipped with inward-opening revolving doors 17 installed on both right 6 and left 7 side vertical panels of air mixture chamber 2 and located between evaporator 12 and condenser 15. The preparation and use of air mixture provide better cooling and efficient condensation of the refrigerant in the condenser 15 that is especially needed when the generator operates under very hot and humid climatic conditions.

The revolving doors 17 are equipped with air filters and are fixed on shafts 18, which revolve by a sampling servomechanism 19 serving to regulate the automatic opening/closing and proper positioning of revolving doors 17. The sampling servomechanism 19 operates in response to commanding generating processor 20 in accordance with a programmed matrix of required outside air flow through the evaporator and condenser under various combinations of outside air temperatures and relative humidity. The higher the outside air temperature, the wider the doors are opened. When at the same time ambient air temperature is lower than 20° C. and relative humidity is less than 30-35%, the sensors system and operating mechanism stop running the water generator and hermetically close the revolving doors 17 for preventing penetration of insects and bacteria into the cabinet of the generator.

If ambient air temperature during daytime grows higher than 20° C. the sensors system and operating mechanism automatically restart the compressor 21, air fans 23 and open the revolving doors 17 up to the proper position according to the ambient temperature and relative humidity. Thus, the water generation, purification and its pumping to the tank of water dispensing block continues.

Variable speed fans 23 serve also for regulating the flow of intake outside air according to a matrix of combinations of outside air temperatures and relative humidity. The noted matrix is programmed in the processor 20 which controls the reliable and efficient operation of refrigerant compressor 21 and as well as the water productivity of the apparatus in accordance with variable temperatures and relative humidity. The intake air filter 11 does not need to be equipped with sensors and other facilities to warn when the air filter is corked, as reverse rotating fan 23 periodically operates in reverse direction. In this regime the stream of outside air periodically blows first through the condenser 15 where it is heated and then passes through the evaporator 12 and afterwards through the air filter 11 where it blows out the dust and pollen from the air filters 11. Besides cleaning the filter 11, the hot air evaporates liquid refrigerant in the evaporator 12 and helps to prevent the freezing of evaporator 12. During the filter cleaning the water generator continues operating and water production is not interrupted which saves energy. The periodicity of the fan's reverse operation for cleaning the air filter 11 is predetermined and executed by the help of a timer connected to the electric circuit of the fan's motor.

The water collected in tank 25 is periodically circulated through the cascade of water filters 32 by pump 31 and recirculated through bypassing pipe 28 and opened water solenoid valve 27 back to tank 25. The repeated circulation of generated water through the cascade of water filters 32 by pump 31 allows using high rate and small-pore, adsorption media such as a porous-carbon block in the NSF-53 certified filter for filtration the water from organic compounds, insects, organic contaminants and heavy-metal compounds to purifying the water in accordance with ASHRAE and U.S. federal standards. During the recirculation the solenoid valve 29 is closed. A timer connected to solenoid valves 27 and 29 controls the predetermined duration of recirculation. When the water in the tank 25 is purified the timer closes the solenoid valve 27 and opens the solenoid valve 29 and pure water is pumped through water supplying pipe 30 to the water-storing tank 35 of the water-dispensing block. The ambient temperature water from collecting tank 25 flows by gravity through UV tube 36 into the hot water tank 37 and constantly is heated by electric heater 42. For delivering hot water the push button tap 43 mounted on hot water conducting tubing is pressed and the hot water from the tank 37 by gravity flows to the user. The temperature of hot water is controlled on the level 90° C. by incorporated thermostat. For preparing cold water the dispensing apparatus includes its own refrigerating machine consisting of compressor 39, condenser coil 40 and evaporator coil 41, which is fitted on the surface of cold-water tank 38. For delivering cold water the push button tap 43 that is mounted on cold water conducting tubing is pressed and the water from cold-water tank 38 flows through the UV tube 36 to the user. A cold-water temperature sensor and switch assembly controls the operation of refrigerator machine to maintain the predetermined temperature of the cold water at about 5° C. For delivering ambient temperature water the push button tap 43 mounted on water conducting tubing is pressed and the ambient temperature water from water storing tank 25 by gravity flows through the UV tube 36 to the user.

The water-storing tank 35 is equipped with air eliminator and water level controlling sensors. The water level in the water-storing tank 35 is controlled by the electrically-operated sensor switch 44, which causes the pump 31 to cease operation when the water-storing tank 35 is filled. In the case of when both water storing tank 35 of the dispenser block and water collecting tank 25 of the water generator block are filled the electrically-operated sensor switch 44 stops at once both compressor 21 and water pump 31 of the water generator block. In the case of when water storing tank 35 of the dispenser block is full of water and water collecting tank 25 of the water generator block is empty or not completely filled the electrically-operated sensor switch 44 stops the water pump 31 of the water generator block but compressor 21 continues operating for producing water to fill the water collecting tank 25 of the water generator block.

In another preferred embodiment of the invention designed to prevent hydraulic shocks, the liquid refrigerant is sub cooled after it exits the condenser 15, the suction gas refrigerant is superheated after it exits the evaporator 12, and an economizer 101 in the form of an intermediate heat exchanger is installed between the condenser 15 and the evaporator 12. The economizer 101 is connected by one side to a discharge line 102 of the compressor 21 and by opposite side to the suction line 104 of the compressor 21.

Software was developed to determine the optimal quantity of ambient air passing through the evaporator 12 and the condenser 15. This software is also useful for maintaining acceptable condensing temperature and pressure levels of the refrigerant.

The water extractor is equipped with a newly developed and constructed plate and tube type evaporator 105 made of stainless steel, and the inside surface of water collecting tank 25 of the extractor is covered by silver coating.

In addition, an oil separator 106 is installed on a discharge line 107 of compressor 21. This oil separator 106 is connected on the bottom side to the crankcase inlet pipe of the compressor 21 and on the top side to the condenser 15. Also assisting with the operation of the compressor 21 and the water extractor is a liquid refrigerant separator 103 installed on the suction line 104 of the compressor 21. The liquid refrigerant separator 103 is connected on one side to the evaporator's inlet pipe 108 and on another side to the compressor.

To provide animate nature and structure water the extractor is equipped with music player chip 109 installed near the water collecting tank and continuously playing sound.

The described system and method of automatic control provides high efficiency and productivity of the invented split type potable water extractor from ambient air and water dispenser.

What is claimed is:

1. A potable water extractor system, comprising:
   an air mixing chamber, said air mixing chamber having a door connected to a servomechanism for controlling the opening and closing of said door to regulate the condition in said air mixing chamber;
   an evaporator located in said air mixing chamber;
   a first refrigerant separator, to which refrigerant flows from said evaporator;
   a compressor, to which said refrigerant flows from said first refrigerant separator; and
   a condenser, to which said refrigerant flows from said compressor, and from which said refrigerant flows back to said evaporator;
   wherein said refrigerant is cycled through said air mixing chamber to effect heat exchange with air circulated in said air mixing chamber such as to produce condensate, said condensate collected as water, said water processed by a water purification system, and the resulting purified water is piped to a water dispensing block for usage.

2. The potable water extractor system of claim 1, further comprising:
   an oil separator located in said air mixing chamber;
   wherein said refrigerant flows through said oil separator after said refrigerant flows from said compressor and before said refrigerant flows to said condenser.

3. The potable water extractor system of claim 2, further comprising:
   an economizer located in said air mixing chamber;
   wherein said refrigerant flows through said economizer after said refrigerant flows from said condenser and before said refrigerant flows to said evaporator.

4. The potable water extractor system of claim 3, wherein the evaporator is a stainless steel plate and tube type evaporator.

5. The potable water extractor system of claim 4, further comprising:
   a receptor tray mounted under said evaporator for collecting said condensate from said evaporator;
   a collecting tank capable of amassing said condensate collected in said receptor tray;
   wherein the inside of said collecting tank is covered by silver coating.

6. The potable water extractor system of claim 2, wherein the evaporator is a stainless steel plate and tube type evaporator.

7. The potable water extractor system of claim 6, further comprising:
   a receptor tray mounted under said evaporator for collecting said condensate from said evaporator;
   a collecting tank capable of amassing said condensate collected in said receptor tray;
   wherein the inside of said collecting tank is covered by silver coating.

8. The potable water extractor system of claim 3, further comprising:
   a receptor tray mounted under said evaporator for collecting said condensate from said evaporator;
   a collecting tank capable of amassing said condensate collected in said receptor tray;
   wherein the inside of said collecting tank is covered by silver coating.

9. The potable water extractor system of claim 1, further comprising:
   an economizer that intercepts said refrigerant flow between said condenser and said evaporator.

10. The potable water extractor system of claim 9, wherein the evaporator is a stainless steel plate and tube type evaporator.

11. The potable water extractor system of claim 10, further comprising:
    a receptor tray mounted under said evaporator for collecting said condensate from said evaporator;
    a collecting tank capable of amassing said condensate collected in said receptor tray;
    wherein the inside of said collecting tank is covered by silver coating.

12. The potable water extractor system, comprising:
    an air mixing chamber, said air mixing chamber having a door connected to a servomechanism for controlling the opening and closing of said door to regulate the condition in said air mixing chamber;
    said air mixing chamber having an opening equipped with an air filter capable of preventing penetration of impurities into said air mixing chamber;
    an evaporator located in said air mixing chamber;
    a compressor, to which said refrigerant flows from said evaporator;
    a refrigerant separator connected to said evaporator and said compressor; and
    a condenser, to which said refrigerant flows from said compressor, and from which said refrigerant flows back to said evaporator;
    a receptor tray mounted under said evaporator for collecting said condensate from said evaporator;
    wherein said refrigerant is cycled through said air mixing chamber to effect heat exchange with air circulated in said air mixing chamber, said heat exchange capable of producing condensate, said condensate collected as water, said water processed by a water purification system, and the resulting purified water is piped to said water dispensing block for usage.

13. The potable water extractor system of claim 12, further comprising:
    an oil separator located in said air mixing chamber;
    wherein said refrigerant flows through said oil separator after said refrigerant flows from said compressor and before said refrigerant flows to said condenser.

14. The potable water extractor system of claim 13, further comprising:

an economizer located in said air mixing chamber;
wherein said refrigerant flows through said economizer after said refrigerant flows from said condenser and before said refrigerant flows to said evaporator.

15. The potable water extractor system of claim 14, wherein the evaporator is a stainless steel plate and tube type evaporator.

16. The potable water extractor system of claim 15, further comprising:
a receptor tray mounted under said evaporator for collecting said condensate from said evaporator;
a collecting tank capable of amassing said condensate collected in said receptor tray;
wherein the inside of said collecting tank is covered by silver coating.

17. A method for extracting water from ambient air and dispensing for usage, the steps comprising:
circulating a refrigerant through a refrigerant system comprising a condenser and an evaporator, said condenser contained in an air mixing chamber; wherein said liquid refrigerant is circulated through a liquid refrigerant separator in said refrigerant system and said liquid refrigerant is sub cooled after it is exhausted from said condenser;
circulating air through said air mixing chamber, wherein the circulation of said air is regulated by a system comprising a hermetic housing enclosure having an inlet port in a front side of said housing, an outlet port in a rear side of said housing, at least one opening regulated by a mechanical door in a side of said housing, and a fan;
causing heat exchange between said refrigerant system and said air circulated in said air mixing chamber to produce condensate;
collecting said condensate;
purifying said condensate through a purification system;
dispensing said purified water for usage.

18. The method for extracting water of claim 17, further comprising:
superheating said refrigerant after it is exhausted from said evaporator.

19. A potable water extractor system, comprising:
a first system for condensing and purifying said water, said first system having a condensing system and a purification system;
said condensing system comprising:
an air mixing chamber, said air mixing chamber having a door connected to a servomechanism for controlling the opening and closing of said door to regulate the condition in said air mixing chamber;
an evaporator located in said air mixing chamber;
a first refrigerant separator, to which refrigerant flows from said evaporator;
a compressor, to which said refrigerant flows from said first refrigerant separator; and
a condenser, to which said refrigerant flows from said compressor, and from which said refrigerant flows back to said evaporator;
wherein said refrigerant is cycled through said air mixing chamber to effect heat exchange with air circulated in said air mixing chamber such as to produce condensate, said condensate collected as water in a first water tank;
said purification system comprising:
a plurality of water filters;
a pump, said pump connected to said first water tank for circulating water in said water tank through said plurality of water filters until said water is purified to a predetermined level, said circulation being regulated by a solenoid valve; and
a second system for dispensing said water, said second system comprising:
a second water tank, said second water tank connected to said first water tank by a water supply pipe;
a UV-transparent tube mounted in connection with said second water tank for providing gravity flow of water to a hot water tank and a cold water tank, said hot and cold water tanks are equipped with taps for dispensing said water.

20. A potable water extractor system, comprising:
a first system for condensing said water, said first system having a condensation system comprising:
an air mixing chamber, said air mixing chamber having a door connected to a servomechanism for controlling he opening and closing of said door to regulate the condition in said air mixing chamber;
an evaporator located in said air mixing chamber;
a first refrigerant separator, to which refrigerant flows from said evaporator;
a compressor, to which said refrigerant flows from said first refrigerant separator; and
a condenser, to which said refrigerant flows from said compressor, and from which said refrigerant flows back to said evaporator;
wherein said refrigerant is cycled through said air mixing chamber to effect heat exchange with air circulated in said air mixing chamber such as to produce condensate, said condensate collected as water in a first water tank;
a second system for purifying and dispensing said water, said second system having a purification system comprising:
a plurality of water filters;
a pump, said pump connected to said first water tank for circulating water in said water tank through said plurality of water filters until said water is purified to a predetermined level, said circulation being regulated by a solenoid valve; and
said second system having a dispensing system comprising:
a second water tank, said second water tank connected to said first water tank by a water supply pipe;
a UV-transparent tube mounted in connection with said second water tank for providing gravity flow of water to a hot water tank and a cold water tank, said hot and cold water tanks are equipped with taps for dispensing said water.

* * * * *